US009946070B2

United States Patent
Tam et al.

(10) Patent No.: US 9,946,070 B2
(45) Date of Patent: Apr. 17, 2018

(54) AUTOMOTIVE HEAD UP DISPLAY

(71) Applicant: Sharp Kabushiki Kaisha, Osaka (JP)

(72) Inventors: Ka Ho Tam, Oxford (GB); David James Montgomery, Bampton (GB)

(73) Assignee: Sharp Kabushiki Kaisha, Osaka (JP)

( * ) Notice: Subject to any disclaimer, the term of this patent is extended or adjusted under 35 U.S.C. 154(b) by 25 days.

(21) Appl. No.: 15/063,850

(22) Filed: Mar. 8, 2016

(65) Prior Publication Data

US 2017/0261746 A1    Sep. 14, 2017

(51) Int. Cl.
| | |
|---|---|
| *G02B 27/14* | (2006.01) |
| *G02B 27/01* | (2006.01) |
| *G09G 3/00* | (2006.01) |
| *G06T 19/00* | (2011.01) |
| *H04N 13/04* | (2006.01) |
| *H04N 13/00* | (2018.01) |

(52) U.S. Cl.
CPC ........ *G02B 27/0101* (2013.01); *G06T 19/006* (2013.01); *G09G 3/002* (2013.01); *H04N 13/004* (2013.01); *H04N 13/0429* (2013.01); *G02B 2027/0118* (2013.01)

(58) Field of Classification Search
CPC ...... G02B 2027/0178; G02B 2027/014; G02B 2027/0127; G02B 2027/0123; G02B 2027/0154; G02B 2027/0194; G02B 27/017; G02B 27/0093; G02B 27/0075; G02B 27/0103; G02B 27/01; G02B 6/12009
USPC ........................................... 359/13, 630–633
See application file for complete search history.

(56) References Cited

U.S. PATENT DOCUMENTS

| | | |
|---|---|---|
| 4,670,744 A | 6/1987 | Buzak |
| 5,764,317 A | 6/1998 | Sadovnik et al. |
| (Continued) | | |

FOREIGN PATENT DOCUMENTS

JP    2004 168230    6/2004

OTHER PUBLICATIONS

Miyazaki, Daisuke et al.; "Volumetric Display System Based on Three-Dimensional Scanning of Inclined Optical Image"; Optics Express vol. 14, No. 26, pp. 12760-12769, 2006.

*Primary Examiner* — Mahidere Sahle
(74) *Attorney, Agent, or Firm* — Renner, Otto, Boisselle & Sklar, LLP

(57) ABSTRACT

A head-up-display (HUD) system includes at least one scanning laser projector operative to generate laser light, and a stacked array of multiple-switchable screens arranged relative to the projector to receive laser light generated by the projector, each screen of the stacked array of multiple-switchable screens spaced apart from one another and operative to switch between a transparent state and a diffusive state. A controller is operatively coupled to the stacked array of multiple-switchable screens, the controller configured to time sequentially switch each screen of the array from a transparent state to a diffusive state, wherein only one screen is switched to the diffusive state at any given time. An output of the projector is arranged at an angle or a distance from imaging optics succeeding the array of screens to prevent a specular beam emitted by the at least one scanning laser projector from intercepting the imaging optics succeeding the array of screens when all screens are in the transparent state.

18 Claims, 18 Drawing Sheets

(56) References Cited

U.S. PATENT DOCUMENTS

| | | |
|---|---|---|
| 6,100,862 A | 8/2000 | Sullivan |
| 6,466,185 B2 * | 10/2002 | Sullivan ............ G02B 27/2278 345/4 |
| 6,714,174 B2 | 3/2004 | Suyama et al. |
| 8,521,411 B2 | 8/2013 | Grabowski et al. |
| 2004/0164927 A1 | 8/2004 | Suyama et al. |

* cited by examiner

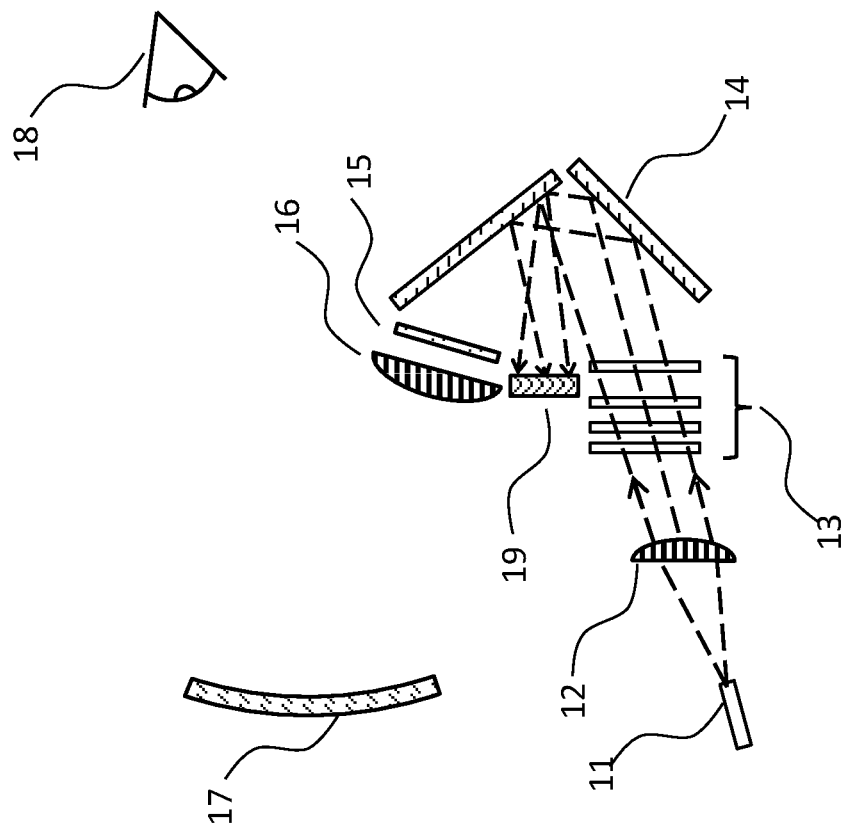

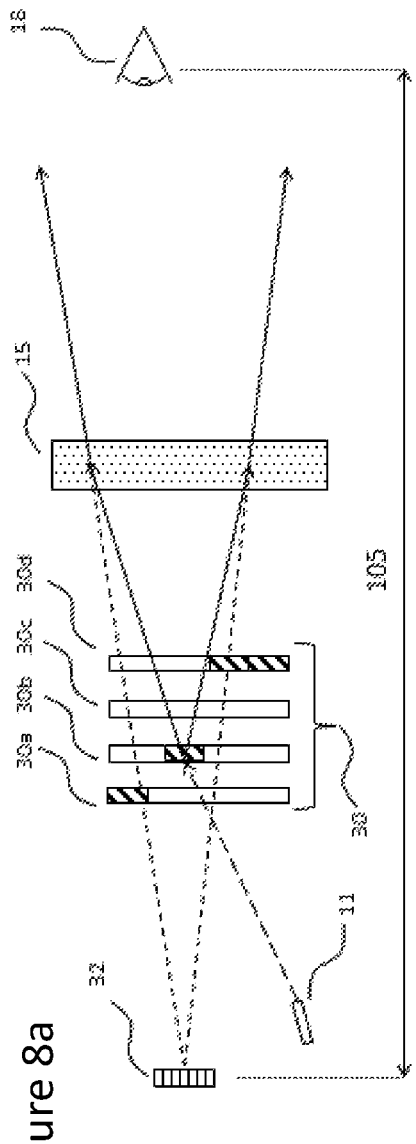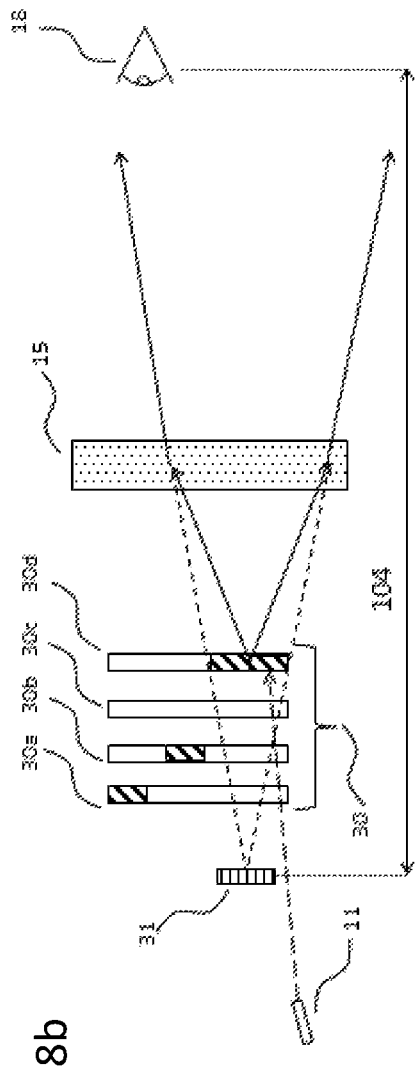
Figure 8a
Figure 8b

AUTOMOTIVE HEAD UP DISPLAY

TECHNICAL FIELD

The invention relates generally to automotive displays and, more particularly, to Head-Up-Displays (HUD) that provide enhanced driving safety.

BACKGROUND ART

Head-Up-Display (HUD) systems enable drivers to view crucial information without the need to look away from the road. Hence HUD systems have become an increasingly important component for automotive use to enhance road safety.

Augmented Reality (AR), provides a three-dimensional (3D) viewing experience. A number of technologies have been developed to provide 3D AR, the most relevant of which are as follows:

U.S. Pat. No. 8,521,411 B2 (Grabowski, Aug. 27, 2013) describes a HUD system that allows a continuous depth volumetric image by rapid mechanical scanning of a lens to re-image a laser beam into floating space. "Opt. Express 14, 12760-12769 (2006)" discloses a method of showing volumetric 3D images with a rapidly rotating mirror scanner to produce multiple slices of inclined images. These mechanical systems suffer from mechanical wear over time and may easily suffer from shock damage if they are not mechanically isolated from the vehicle. Further, the former system would only provide a cable image and hence can only display very limited information to the driver.

US20040164927A1 (Suyama, Aug. 26, 2004) describes a system where a liquid crystal Fresnel lens with a rapidly variable focal length is used to re-image a display panel to produce a volumetric image. The lens used for this system requires a large variation in power and a fast switching speed. For the system to work, the lens would either need to be very thick, which would compromise its switching speed, or have very small Fresnel zone size, which would compromise its image quality. For the lens to switch fast enough to display large depth variation volumetric images, a special type of "dual-frequency" liquid crystals will be required. This type of liquid crystal has not yet been utilized in mass display products, may not necessarily meet automotive standards, and may be expensive to be used in large volume production.

JP2004168230A describes an automotive HUD system that uses multiple pixelated liquid crystal panels and an ordinary backlight unit to display images at different depths. Such a system will have a very low optical efficiency, meaning the system will consume significant power to achieve high brightness required by automotive displays. The system would also have a limited display contrast, which is a known limitation of liquid crystal display panels with ordinary backlights.

U.S. Pat. No. 5,764,317 (Sadovnik, Jun. 9, 1988) and U.S. Pat. No. 6,100,862 (Sullivan, Aug. 8, 2000) describe systems that produce volumetric images by using a projector to sequentially project a different image onto an array of switchable screens. However, these systems are only capable of displaying images at discrete depth planes. Since the screens can never be fully transparent, haze will become noticeable if the number of screens is increased in attempt to display a pseudo-continuous volumetric image.

U.S. Pat. No. 4,670,744 (Buzak, Jun. 2, 1987) describes a system that uses a stack of cholesteric liquid crystal as switchable mirrors to change the optical distance between a display panel and the observer. The switchable reflectors are highly dependent on wavelength and angle of the incident light, making it unsuitable for full-color displays.

Currently there is no augmented reality technology that can achieve low haze, can be manufactured at a relatively low cost, and provide continuous volume augmented reality that uses readily-mass-manufacturable materials that fit automotive performance and safety standards.

SUMMARY OF INVENTION

The use of three dimensional augmented reality (AR) technologies would allow information being displayed to be integrated into the background traffic. An apparatus in accordance with the present invention relates to a Head-Up-Display (HUD) system suitable for automotive use and augmented reality applications. The solution aims to solve one or more problems in the prior art, such as haze, switching speed, color performance, optical efficiency, cost to manufacture, the need for the system's materials' performance to fit automotive requirements, and the need for the system's image quality and safety to automotive standard.

According to one aspect of the invention, a head-up-display (HUD) system includes: at least one scanning laser projector operative to generate laser light; a stacked array of multiple-switchable screens arranged relative to the projector to receive laser light generated by the projector, each screen of the stacked array of multiple-switchable screens spaced apart from one another and operative to switch between a transparent state and a diffusive state; and a controller operatively coupled to the stacked array of multiple-switchable screens, the controller configured to time sequentially switch each screen of the array from a transparent state to a diffusive state, wherein only one screen is switched to the diffusive state at a given time. An output of the projector is arranged at an angle or a distance from imaging optics succeeding the array of screens to prevent a specular beam emitted by the at least one scanning laser projector from intercepting the imaging optics succeeding the array of screens when all screens are in the transparent state.

According to another aspect of the invention, a head-up-display (HUD) system includes: a stacked array of screens, each screen of the stacked array screens spaced apart from one another and comprising transparent display panels including pixels capable of providing full image resolution; and a controller operatively coupled to the stacked array of screens, the controller configured to time sequentially display an image on each screen of the array.

According to another aspect of the invention, a head-u-display includes at least one scanning laser projector operative to generate laser light; a stacked array of multiple-switchable screens arranged relative to the projector to receive laser light generated by the projector, each screen of the stacked array of multiple-switchable screens spaced apart from one another and operative to switch between a transparent state and a diffusive state; a first variable power lens arranged relative to the stacked array of multiple-switchable of screens to receive an image from the stacked array of multiple-switchable screens, the first variable power lens having a variable focal length; and a controller operatively coupled to the stacked array of multiple-switchable screens, the controller configured to time sequentially switch each screen of the array from a transparent state to a diffusive state, wherein only one screen is switched to the diffusive state at a given time.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIGS. 6a and 6b are schematic diagrams illustrating an optical path of a specular laser coming directly from a projector in possible instances where none of the screens are fully diffusive.

FIGS. 8a and 8b are schematic diagrams illustrating an apparatus in accordance with another embodiment of the invention, where the switchable projector screen is pixelated for low temperature operation

DESCRIPTION OF REFERENCE NUMERALS

Figure 1:
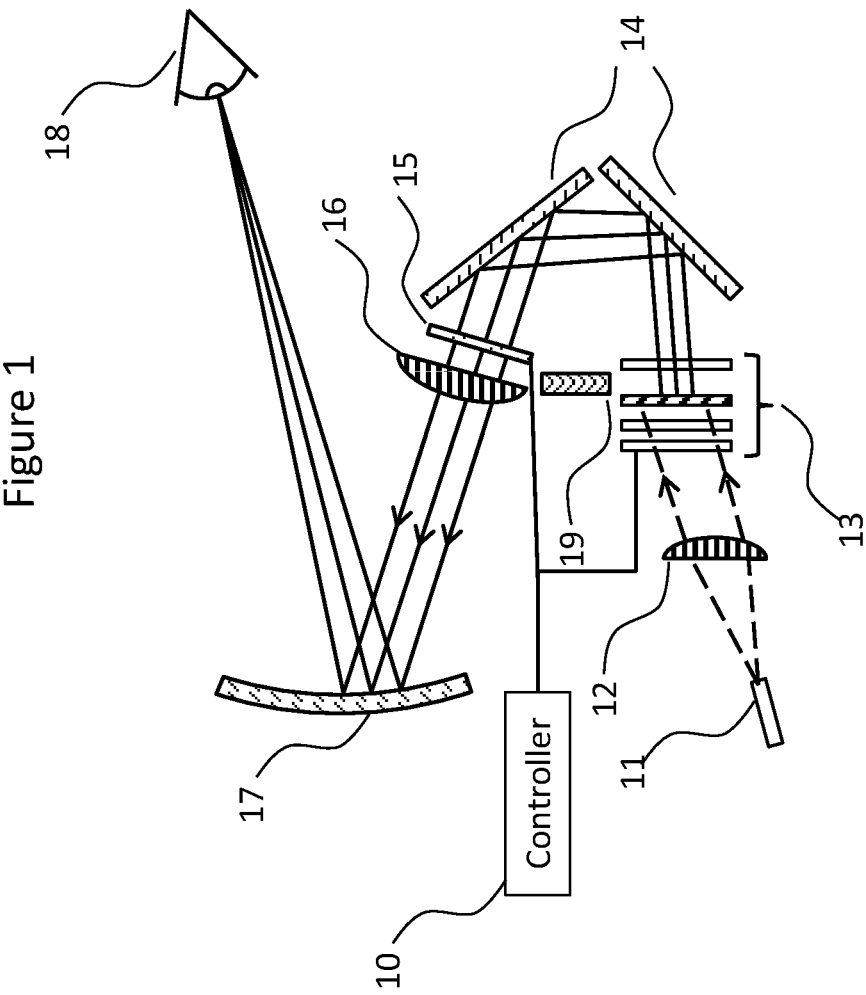
FIG. 1 is a schematic diagram of an exemplary system in accordance with an embodiment of the invention.

11: Scanning Laser Projector according to the first embodiment
12: Lens according to the first embodiment
13: PDLC screens according to the first embodiment
13a-d: PDLC screens at different positions.
14: Mirrors
15: Liquid crystal lens according to the first embodiment
15a: Liquid crystal filling
15b: Transparent polymer
15c: Indium Tin Oxide
15d: Substrate of LC lens cell
15e: Polarizer
16: Imaging lens
17: Combiner of the HUD system
18: Driver/Observer
19: Laser beam block
20: Volume where the continuous sets of virtual images can be created by the screens 13a-13d and the LC lens 15.
21: Virtual image according to the first embodiment
22: Instantaneous cross section of laser beam according to the first embodiment.
a: uncollimated beam directly from the projector
b: collimated laser beam with beam waist focus to a position within the stack of PDLC screens.
23: Electronics for the LC lens according to the first embodiment
24: PDLC driver according to the first embodiment
25: Graphics signal sent to the projector
26: Synchronization Unit according to the first embodiment
30a-d: Pixelated PDLC screens according to the third embodiment
31: Lower part of the virtual image according to the third embodiment
32: Upper part of the virtual image according to the third embodiment
40: PSCT screens used in backscattering geometry according to the forth embodiment
41: Partially transparent mirror according to the fifth embodiment
50: Polarization preserving switchable screens according to the fifth embodiment
51: Absorbing Polarizer according to the fifth embodiment
60: A variable power lens capable of refocusing to a discrete number of focal lengths according to the sixth embodiment.
70a-d: An array of transparent display panels according to the seventh embodiment
80a-c: Multiple projectors, where each of them may project a different image onto one or more screens according to the eighth embodiment.
81a-d: PDLC screens according to the eighth embodiment.
90: Interference filters according to the ninth embodiment.
91: Scattering profile of PDLC screens according to the ninth embodiment.
92: Transmission profile of interference filter at laser wavelength according to the ninth embodiment.
93: PDLC screen in scattering state.
100: Beam waist of laser according to the first embodiment.
101: Rayleigh length of laser according to the first embodiment.

102: Distance between one of the virtual images within the continuously possible set of images 20 and the driver 18.
103: Distance between virtual image 21 and the driver 18.
104: Distance between virtual image 31 and the driver 18.
105: Distance between virtual image 32 and the driver 18.
106: Eye-to-eye distance of an ordinary driver
107a-c: The various possible focal lengths of the lens 60
108: Optical axis of the imaging optics following the switchable screens such as 15, 16, and/or 17
109: Offset distance of the projector from the optical axis 108
110: Offset angle of the projector from the optical axis 108
111: Specular laser beam paths in the case where all switchable screens are transparent.

DETAILED DESCRIPTION OF INVENTION

An apparatus in accordance with the present invention can include a laser projector, a stacked array of electrically switchable screens, and a variable power lens. A geometry between the components of the apparatus can be arranged such that an exit pupil of the laser projector will never be visible to the driver even when all electrically switchable screens are simultaneously switched transparent to the transparent state.

The laser projector can be, for example, a laser Micro-Electro-Mechanical Systems (MEMS) scanning projector where the projected image has a large depth of focus and does not require precise focusing. The projector projects an image onto a stack of several switchable diffusing screens, which can be re-imaged by a variable focal lens and other fixed optics to produce a virtual image that appears to be floating in real space at a continuously variable distance from the driver.

Each of the screens in the system is capable of independently switching between a transparent and a diffusive state via an applied voltage. In order to reduce Fresnel reflections from the surface of the screens, the screens can be glued to refractive index matching material blocks or the screens' surface may be anti-reflection coated. Depending on the availability, cost, image quality and switching speed requirements, the screens can be made from materials in the known arts, such as Polymer Dispersed Liquid Crystal (PDLC), Polymer Network Liquid Crystal (PNLC), Polymer Stabilized Cholesteric Texture (PSCT), or holographic switchable diffusers.

The variable power lens can have a continuously variable dioptre power tuneable with electrical signals. The lens can be made of, for example, diffractive, surface refractive, gradient refractive, or reflective Fresnel lens. The lens can be immersed in nematic liquid crystals, PDLC with sub-wavelength sized domains, blue phase liquid crystal, or other known methods of electric-tuneable optical path thickness for light polarized in one or more directions. Alternatively, other known types of variable power lenses, including mechanical focusing lenses, mechanical mirrors, electrowetting lens, and liquid lenses can also be used.

During operation, each screen can be switched to a diffusive state time sequentially, and the projector forms a different image on the diffused screen. This is re-imaged by a variable focus lens and other subsequent optics such as a refractive lens and a partially transparent combiner mirror, resulting in a virtual image some distance away from the driver.

The projector's image frame is synchronized with the screens' sequence as well as the power of the variable lens such that the system's operation allows a different image to be displayed at a continuous choice of depths.

Because the virtual image is formed by a single optical system, it exhibits all depth cues such as focus, binocular convergence, and motion parallax, making it comfortable for long term viewing. Continuously variable virtual image depth in the system allows the virtual image to be seamlessly integrated into the traffic scene.

The range of positions that can be formed by the full HUD system becomes a combinatorial set of images that can be formed from each screen by the variable power lens. Since switching speed of liquid crystal cells are inversely proportional to the square of the cell gap thickness, adding extra switchable screens into the system would provide quadratic improvement to system's switching speed while still providing the full depth range of virtual images.

A first embodiment of a display in accordance with the invention is shown in FIGS. 1-6 and described in the following paragraphs. The illustrated embodiment is a head-up-display system where the overall optical components are shown in FIG. 1. The display includes a laser scanning projector 11 followed by a lens 12 and a stacked array of multiple-switchable screens 13. The laser scanning projector 11 can be a Micro-ElectroMechanical Systems (MEMS) which allows a high resolution image to be displayed over a large depth of focus. A controller 10 is operatively coupled to the projector 11 and the stacked array of screens 13 and configured to operate the HUD system as described herein.

Although the lens 12 in this embodiment is illustrated as a single element lens, it can also include several groups or elements. The stack of screens 13 are capable of being independently switched by the controller 10 between a transparent and a diffusive state by applying an electrical signal to each of them. The material used for the screen may be Polymer Dispersed Liquid Crystal (PDLC). The screen can also be made of other known materials that are capable of being used as switchable diffusers such as Polymer Stabilized Cholesteric Texture (PSCT), Polymer Network Liquid Crystal (PNLC), or holographic switchable diffusers. The number of screens N in the stack should be such that the amount of haze from the N−1 transparent screens would be acceptable under dark conditions such as night driving.

The projector 11, based on commands from the controller 10, forms an image on one of the PDLC screens 13. This is re-imaged by the subsequent optics in the system including, for example, mirrors 14, a variable power lens 15, other fixed optics 16, and a combiner 17 to form a virtual image that appears to be some distance away from the driver 18. Depending on the required image quality, the fixed optics 16 may or may not be present and could be placed before or after the variable power lens 15. The fixed optics could include one or more spherical, aspherical, freeform, and diffractive elements in order to reduce distortion and optical aberrations in the virtual image.

The combiner 17, for example, may be a piece of curved, high reflection dielectric coated partially transparent and partially reflective optical element. However, the combiner's shape may also be flat, curved, segmented, progressive powered, segmented prism, or Fresnel lens profiled and can also be metallic or holographic coated.

Figure 2:
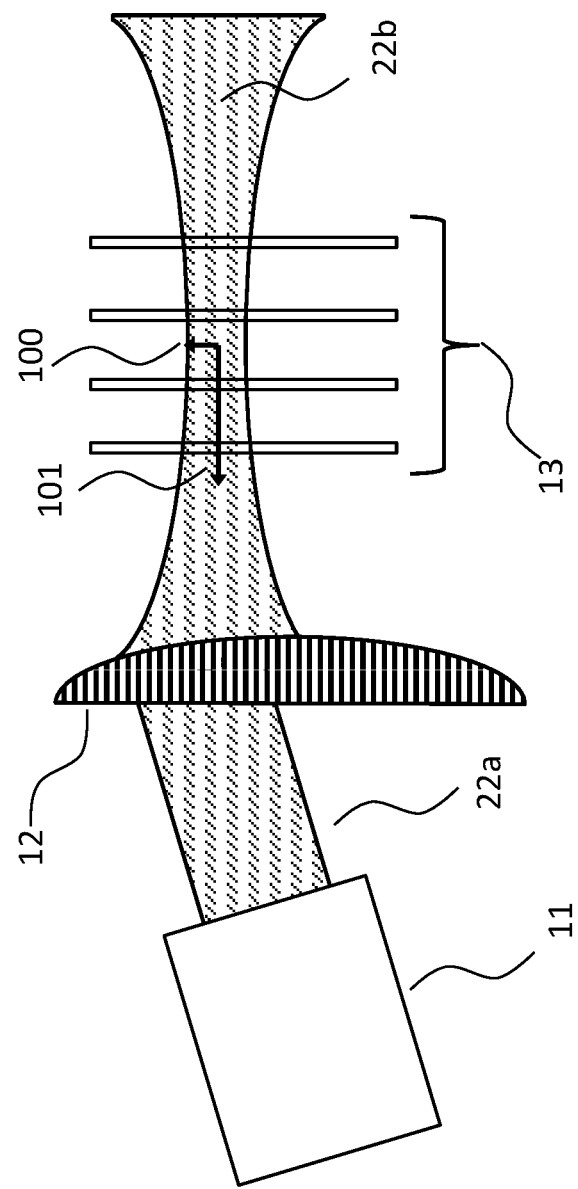
FIG. 2 is a schematic diagram illustrating a position of a laser beam waist within/near a stack of LC screens.

FIG. 2 shows that the function of the lens 12 is to improve the collimation of the specular beam 22a from the projector to produce a collimated scanning laser beam 22b. A further function of the lens 12 is to control the beam waist radius 100 to be no larger than twice the effective pixel size of the projector. The beam waist radius is the distance from the beam axis where the intensity drops to 13.5% of the maximum value. Whereas the effective pixel size of is given as the minimum of either the projector's pixel size on the screen or the resolution resolvable by the subsequent optics (e.g., 15, 16, 17 in FIG. 1). A further function of the lens 12 is to position the beam waist to be within (between the first screen and the last screen of) the PDLC stack, and to make the Rayleigh length 101 of the laser beam larger than or close to the axial span of all the PDLC screens. This allows an image with effective resolution of VGA or better to be displayed onto any screen without the need of an active focus modulator or a large physical system size. Although the lens 12 in the illustrated embodiment is a fixed lens, a second variable power lens can be used to actively focus the image onto the screen if the resolution of the image needs to be improved significantly beyond WXGA.

Figure 3:
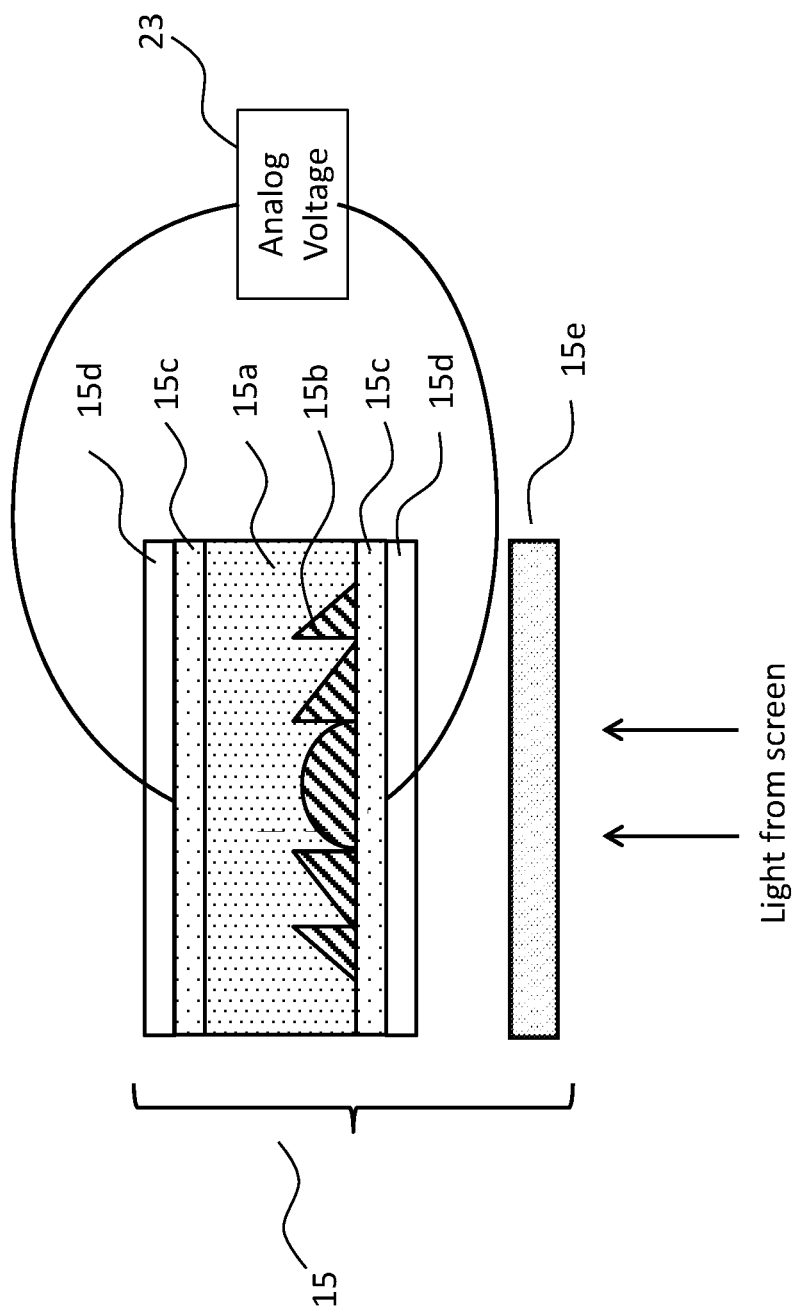
FIG. 3 is a schematic diagram illustrating detailed structure of an exemplary variable power lens.

FIG. 3 illustrates an exemplary structure of the variable power lens 15 originally shown in FIG. 1. The preferred lens is a liquid crystal (LC) lens with a continuously variable focal length. The component includes a Fresnel lens 15*b* moulded from a transparent polymer, which is embossed within liquid crystal 15*a*. The liquid crystal 15*a* should meet the performance requirements for the automotive industry. The liquid crystal cell is sandwiched between two layers of transparent electrodes 15*c* and substrate 15*d*. The liquid crystal 15*a* is rubbed in a way such that applying a voltage to the electrodes will change the effective refractive index of the liquid crystal 15*a* as seen by incident light polarized by a polarizer 15*e*. This creates a variable difference in refractive index between the polymer of the Fresnel lens 15*b* and the liquid crystal 15*a*, meaning that the power of the variable power lens 15 can be continuously varied by adjusting the amplitude of the applied voltage. However, other known configurations of liquid crystal lenses and known variable power lenses can also be used in the system. This includes, for example, the use of liquid lenses, switchable diffractive lenses, mechanical methods of varying the power of a lens, as well as known methods of varying the optical distance between a lens and the screen.

The profile of the Fresnel lens 15*b* can take the form of any shape, including spherical, aspheric, and prisms. The substrate 15*d* can be either flat or curved. However the longest linear dimension of the variable power lens 15, after accounting for the magnification of the subsequent optics 16 and 17, should be larger than the eye-to-eye distance 106 (See FIG. 5) of an ordinary driver 18. In this way, a virtual image with the size at least as large as the lens 15 will be simultaneously visible to both eyes.

Figure 4:
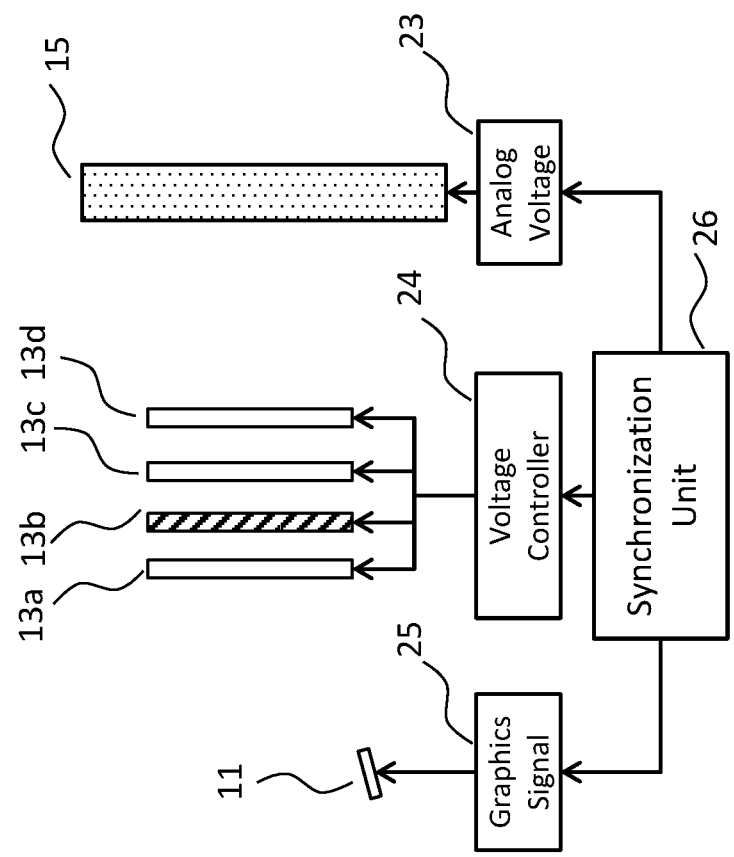
FIG. 4 is an electronic signal diagram for operating an apparatus in accordance with the invention.

FIG. 4 shows the exemplary HUD system at the level of electronics signal. In the preferred HUD system, graphical signal 25 sent to the projector 11 is time synchronized with a switching sequence generated by a voltage controller 24 and provided to the screens 13*a*-13*d* as well as voltage 23 for controlling the focal length of the variable power lens 15. The graphics signal 25 can be sequences of image frames, but can also be any general instructions to steer the laser beam to arbitrary positions. A synchronization unit 26, which can be implemented at the software level using the controller 10 or other processing device, coordinates the graphics signal 25 provided to the projector 11, the voltage controller 24 for generating the switching sequence of the screens 13*a*-13*d* and the voltage 23 for controlling a focal length of the variable power lens 15.

Figure 5A:
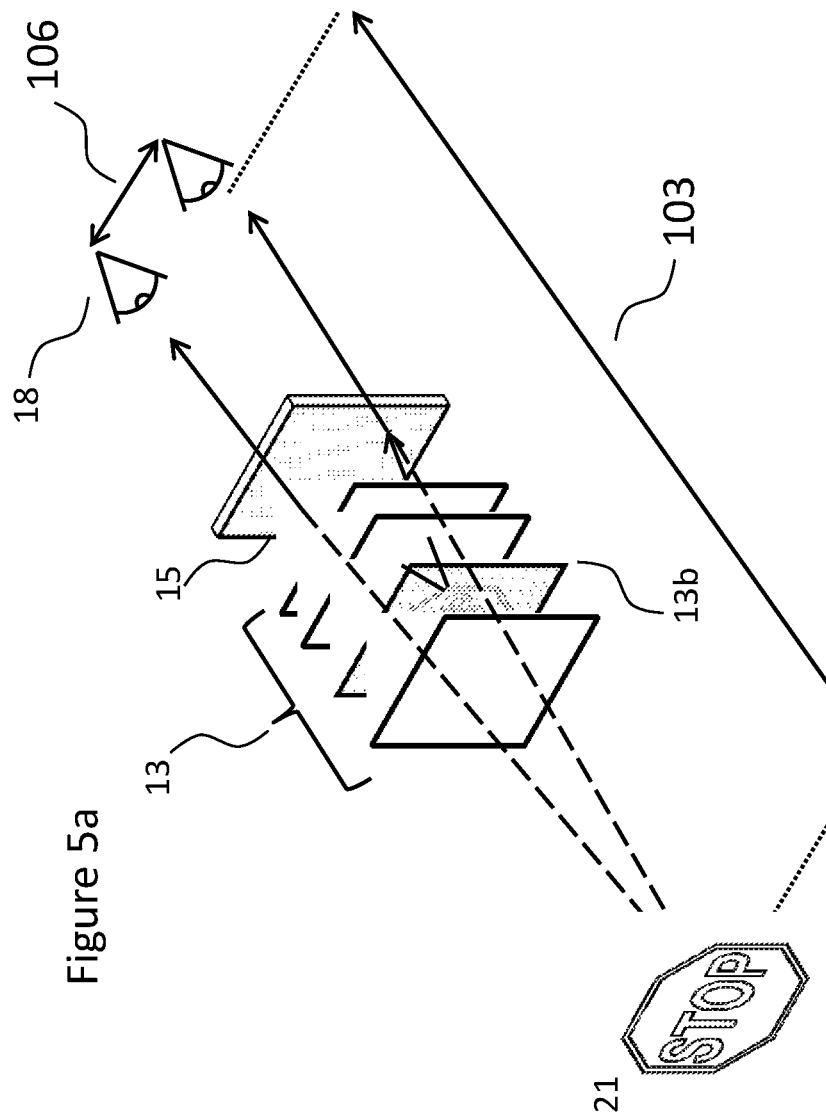
FIGS. 5a and 5b are schematic diagrams showing a virtual image formed by an LC lens.
Figure 5B:
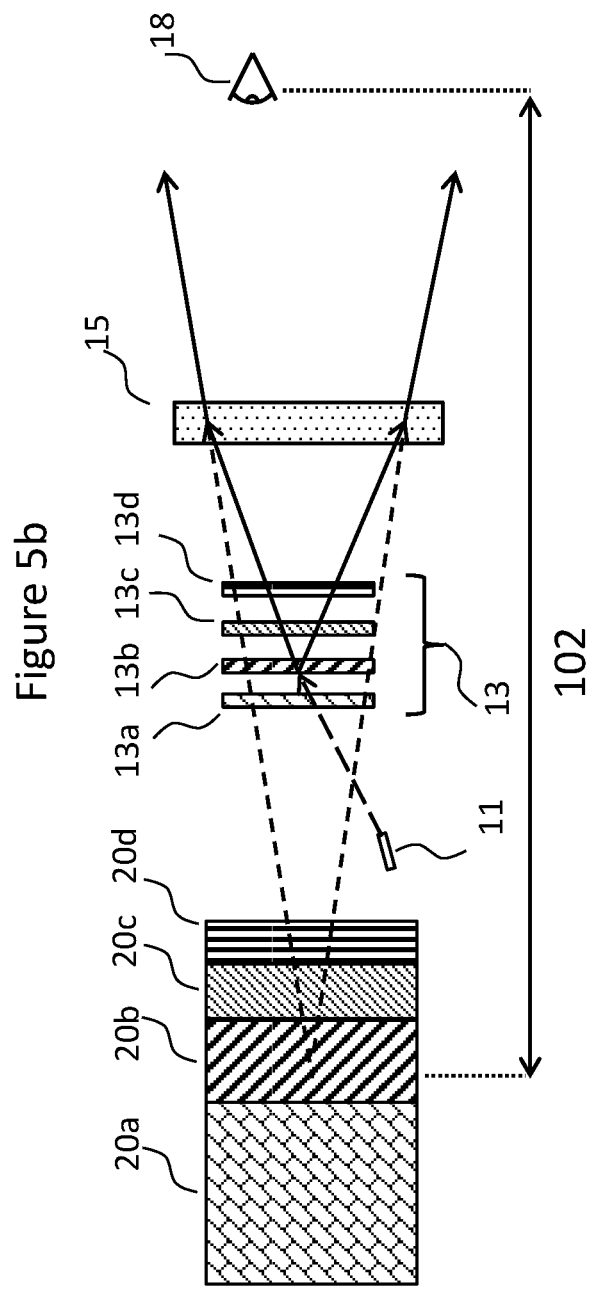

FIG. 5*a-b* shows the operation of an exemplary HUD system. During operation, each screen 13 is switched by the controller 10 diffusive time sequentially, but only one screen (e.g., 13*b*) is switched diffusive at any given time, allowing a virtual image 21 to be formed in space at a distance 103 from the driver as depicted in FIG. 5*a*.

Meanwhile, the controller 10 may continually sweep the power of the lens 15 from minimum to maximum back and forth (e.g., the focal length of the variable power lens may continually sweep between a first focal length and a second, different, focal length). FIG. 5*b* shows that varying the lens's power allows the distance 102 of the virtual image 21 to be continuously varied over a limited range. This allows the image formed by each PDLC screen 13*a*, 13*b*, 13*c*, and 13*d* to be re-imaged to anywhere within a respective continuous volume 20*a*, 20*b*, 20*c*, and 20*d*. The switching order of the screens and the voltage signal applied to the LC variable power lens 15 could also depend on the content being displayed. The image volumes 20*a*-20*d* may or may not overlap. Having a non-overlapping volume means that a weaker LC variable power lens 15 can be used hence leading to a faster switching speed; whereas having an overlapping volume may allow reduction in image flickering in cases where the switching cycle time of the screens exceeds the switching time of the LC variable power lens 15.

The combinatorial effect of the LC variable power lens 15 and the PDLC screen means that the LC variable power lens 15 would not be required to very thick while still allowing the image to be displayed within a large volume. Since the switching time of liquid crystal-filled cells scales with the square of the cell gap thickness, increasing the number of screens would improve the switching speed of the system quadratically. This significant improvement enables a full continuously volumetric system to be made from automotive grade liquid crystals—which could not be achievable in the known prior art. Secondly, the weak LC variable power lens 15 would allow the embossed Fresnel lens structure to have a smaller gradient, leading to lower fabrication tolerance requirements and costs, as well as better image quality due to reduction in liquid crystal splay, bend, and twist that arises from non-uniform cell gaps.

Figure 6B:
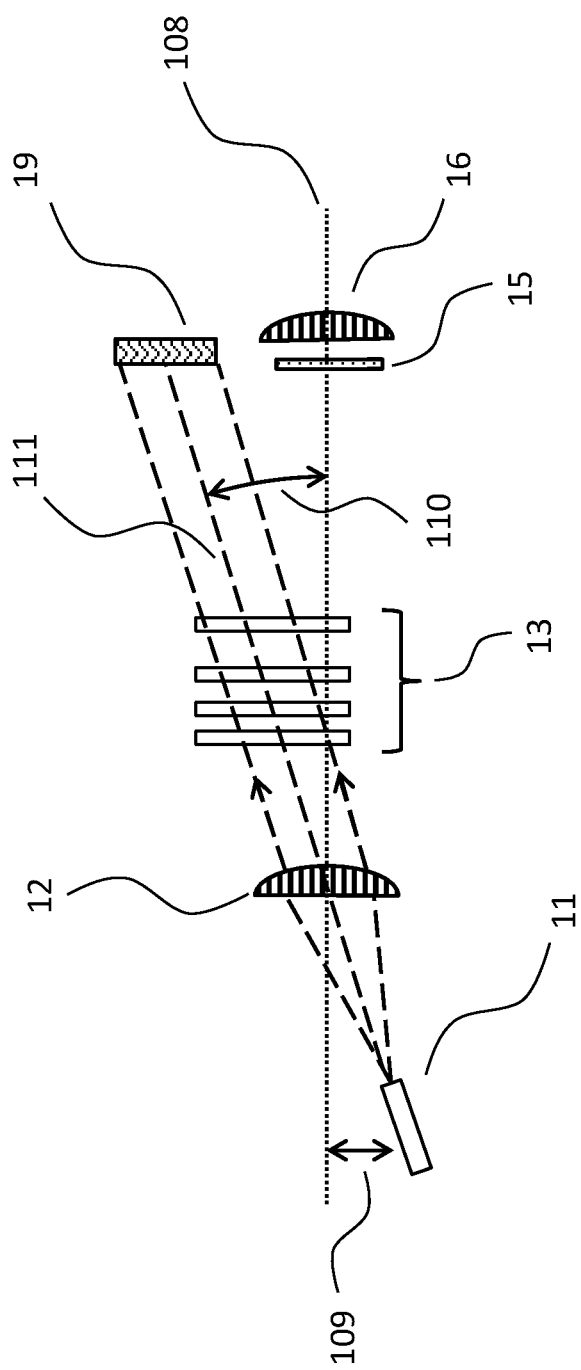

FIG. 6*a* shows an exemplary safety feature which can help the system meet automotive standards. To prevent the specular laser beam from being visible to the driver under possible instances where none of the screens are fully diffusive, the laser projector 11 can be offset from the subsequent optics. FIG. 6*b* shows the same optical arrangement as FIG. 6*a* but with the fold mirrors 14 removed to show more clearly the possible arrangement of the projector 11. The projector 11 can be offset at a distance 109 and/or an angle 110 from the optical axis of the subsequent optics (e.g., 15 and 16) such that the scanning specular beam path 111 would never intercept these components (e.g., 15 and 16). If all screens are simultaneously transparent, the specular laser beam will be directly incident onto a beam block 19 or onto other non-glossy elements such that none of the specular beam will exit the system through other optics such as 15 and 16. The tilt angle of the projector should be just large enough for the specular beam not to escape from the HUD enclosure, as a tilt angle that is too large (e.g., >20 degrees) may introduce haze in the image.

Subsequent embodiments described below are made in reference to the first embodiment and only the differences between the subsequent embodiments and the first embodiments are discussed.

Figure 7:
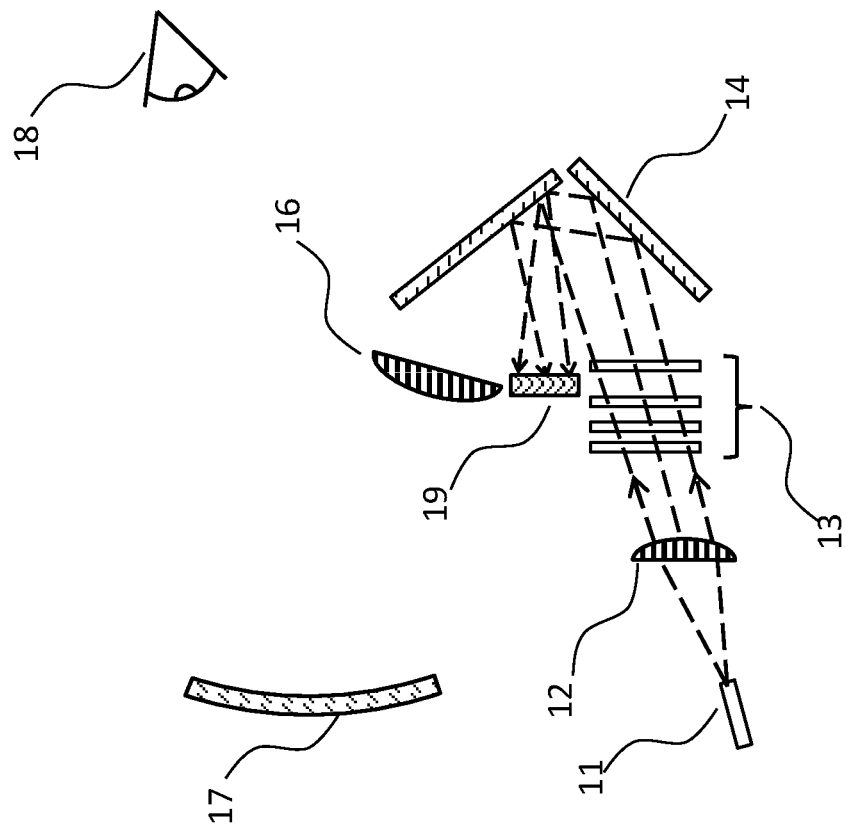
FIG. 7 is a schematic diagram illustrating another embodiment of an apparatus in accordance with the invention, the apparatus not having a variable power lens. Also shown in FIG. 7 is the optical path of the specular laser emitted by the projector.

A second embodiment of the system is shown in FIG. 7. In the case where continuously variable image depth is not required, the variable power lens 15 from the first embodiment is not needed and thus is omitted from FIG. 7. In this case, the projector's specular beam is still permanently hidden from the driver's access.

FIGS. 8*a*-8*b* illustrate a third embodiment that includes a laser projector 11, switchable projector screens 30*a*-30*d* (collectively referred to as switchable projector screen 30), and variable power lens 15. This embodiment differs from the main embodiment as the switchable projector screens 30 are pixelated or partitioned such that only a portion of the same screen can be switched diffusive at any given time (rather than the whole screen being switched uniformly diffusive or transparent). The material of the screen could be, but is not limited to, PDLC.

This system enables images 31, 32 to be perceived by a driver 18 at different depths 104, 105, where the images are displayed to the driver simultaneously without the need of temporally switching on and off different screens.

Figure 9:
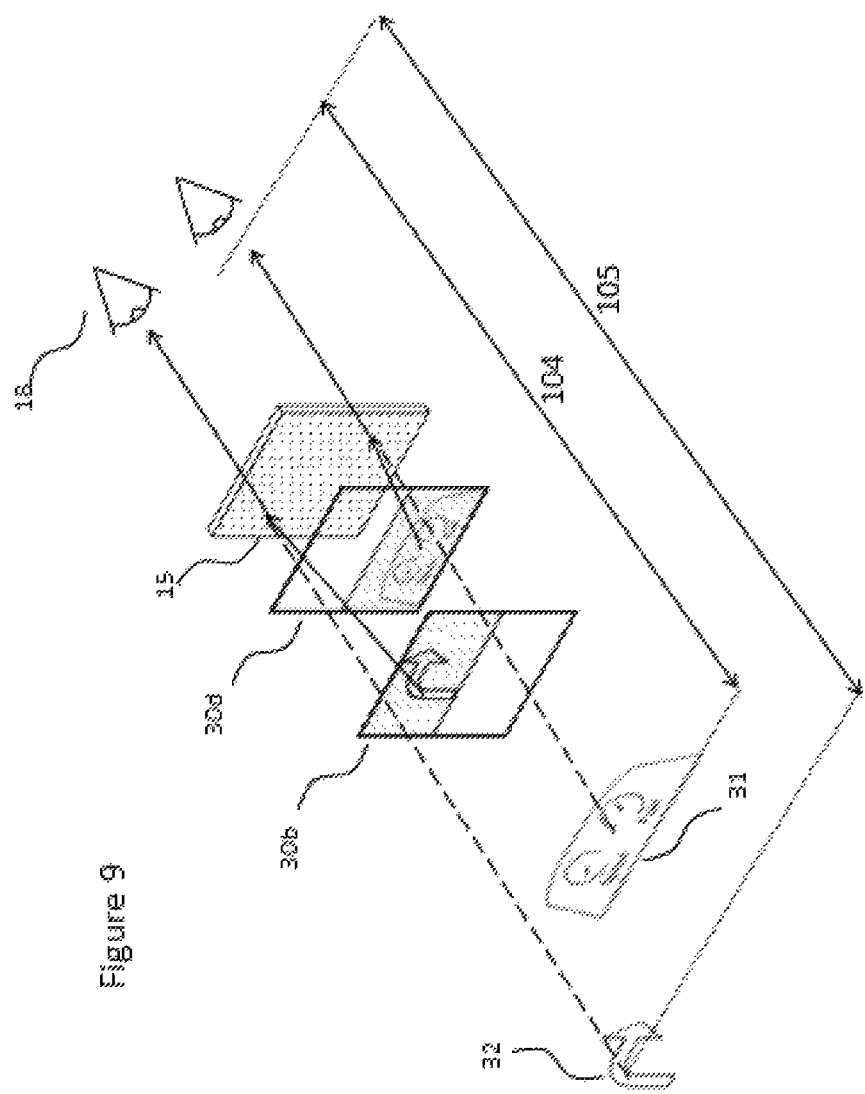
FIG. 9 is a schematic diagram showing advantages of a hybrid spatial-temporal multiplexed system.

FIG. 9 is the same embodiment shown in FIGS. 8*a*-8*b* and illustrates how the system can benefit from spatial multiplexing by showing a dashboard image 31 in one screen's partition 30*d* and traffic information image 32 on another screen's partition 30*b*. This would be advantageous in cold conditions where the switching speed of the screens may slow down significantly. It should be noted that, unlike JP2004168230A, the image quality in this embodiment does not depend on the size of the pixels. Instead, the image quality of this system depends solely on the projector's resolution and the laser beam waist. This means the screens can be coarsely pixelated to achieve spatial multiplexing. Since full volumetric images displayed in automotive HUDs usually contain large patches of blank space, coarsely pixelated screens would allow high resolution images to be displayed without expensive requirements in computational power.

Figure 10:
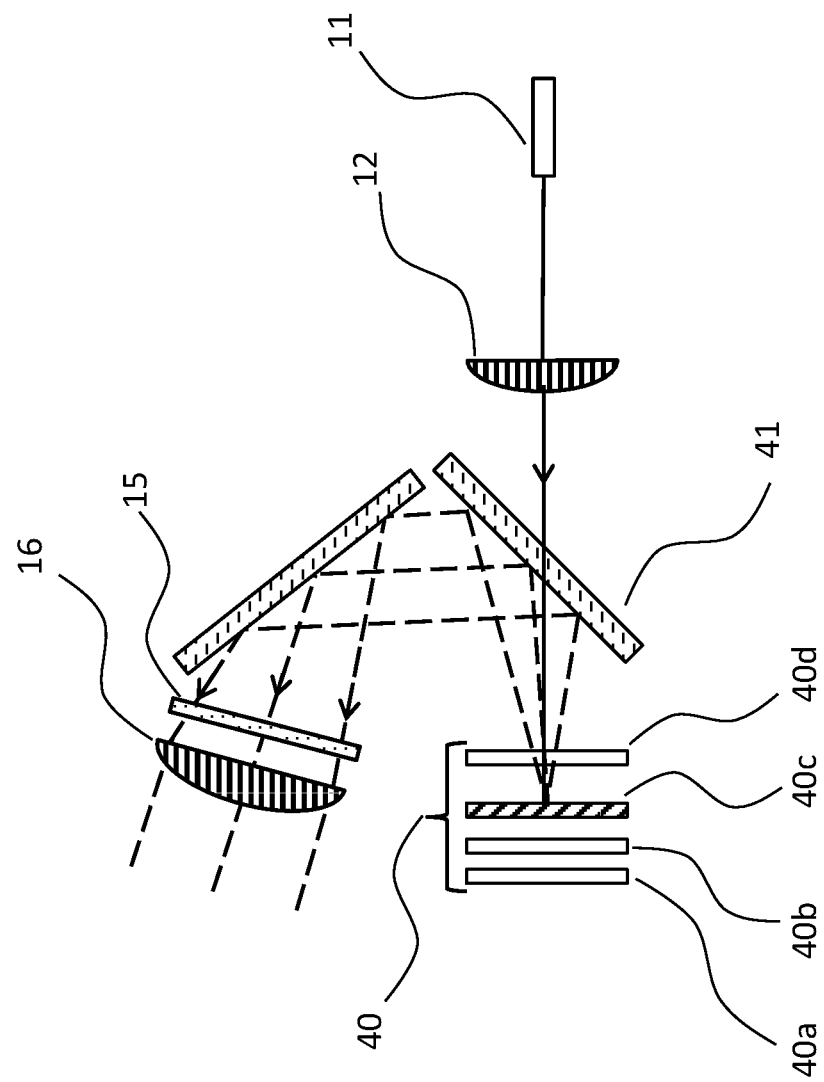
FIG. 10 is a schematic diagram illustrating an apparatus in accordance with another embodiment of the invention with backscattering geometry that eliminates beam blocks.

FIG. 10 illustrates a fourth embodiment where the projector 11 is arranged to be physically closer to the screen 40*d* than all other screens (40*a-c*), where 40*d* represent the screen that is optically closest to the driver 18. In this embodiment, the virtual image comes from back scattered light from the switchable screens 40. The screens 40 can be made of known materials with a satisfactory backscattering efficiency such as Polymer Stabilized Cholesteric Texture (PSCT). The last screen 40*a* (i.e., the screen optically furthest from the driver 18) may be replaced by a permanent diffuser. This means if the screens are anti-reflection coated, there will be no need to use a beam block in the system.

In addition, one of the mirrors 14 from the first embodiment can be replaced by a partially transparent mirror or a beam splitter 41 to allow the projector's beam to reach the screens, but the mirror can also remain fully reflective if it is not obscuring the projector's light. This embodiment allows more flexibility in the folding up of the HUD system without potentially exposing the projector's exit pupil to the driver when none of the screens are fully diffusive at any instance.

Figure 11:
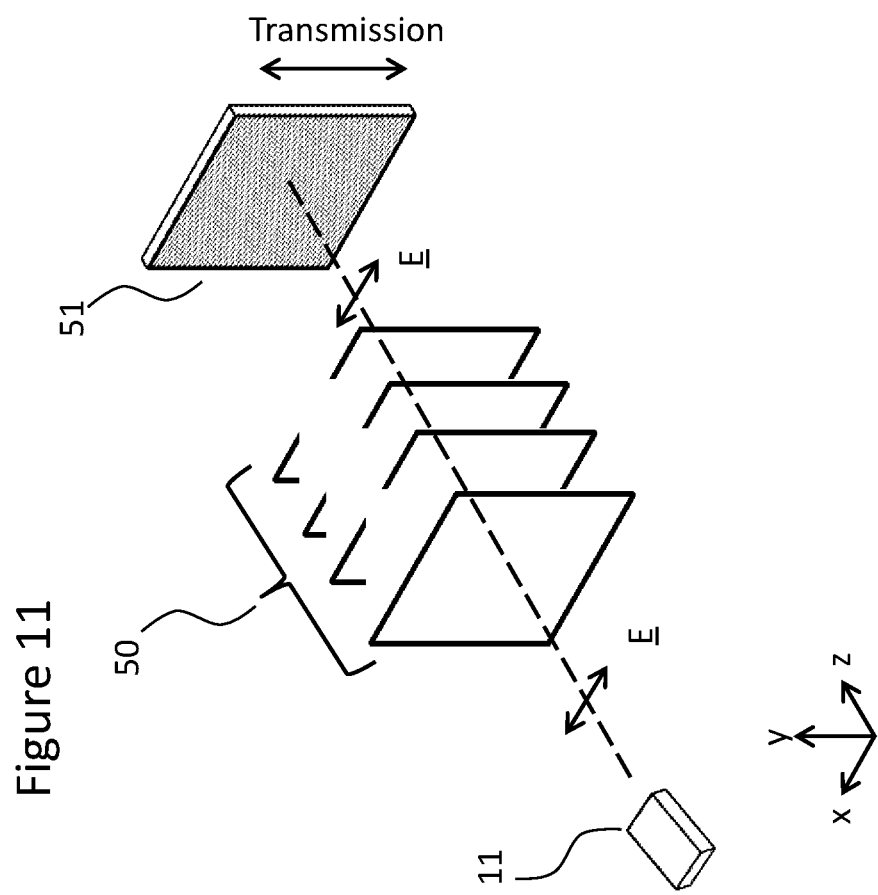
FIG. 11 is a schematic diagram illustrating an apparatus in accordance with another embodiment of the invention, where the laser beam is blocked.

FIG. 11 illustrates a fifth embodiment where a stack of switchable screens 50 is used instead of the screens 13 proposed in the first embodiment. When the screens 50 are in the transparent state, the polarization state of light transmitted through the screens is preserved (i.e., the polarization of the light passing through the screen is unaltered or altered by a small amount such that a specular beam transmitted through the polarizer 51 would be safe for the driver). This allows polarized light coming from the projector 11 to be simply blocked by a polarizer 51 if all the screens are clear. Therefore, the specular laser beam is not visible to the driver and thus additional measures (e.g., off-axis geometry) to prevent such visibility are not needed. The screens 50 can be PDLC screens made of low birefringence polymers, switchable holographic diffusers, or any other known switchable screens that preserves polarization in the transparent state.

Figure 12:
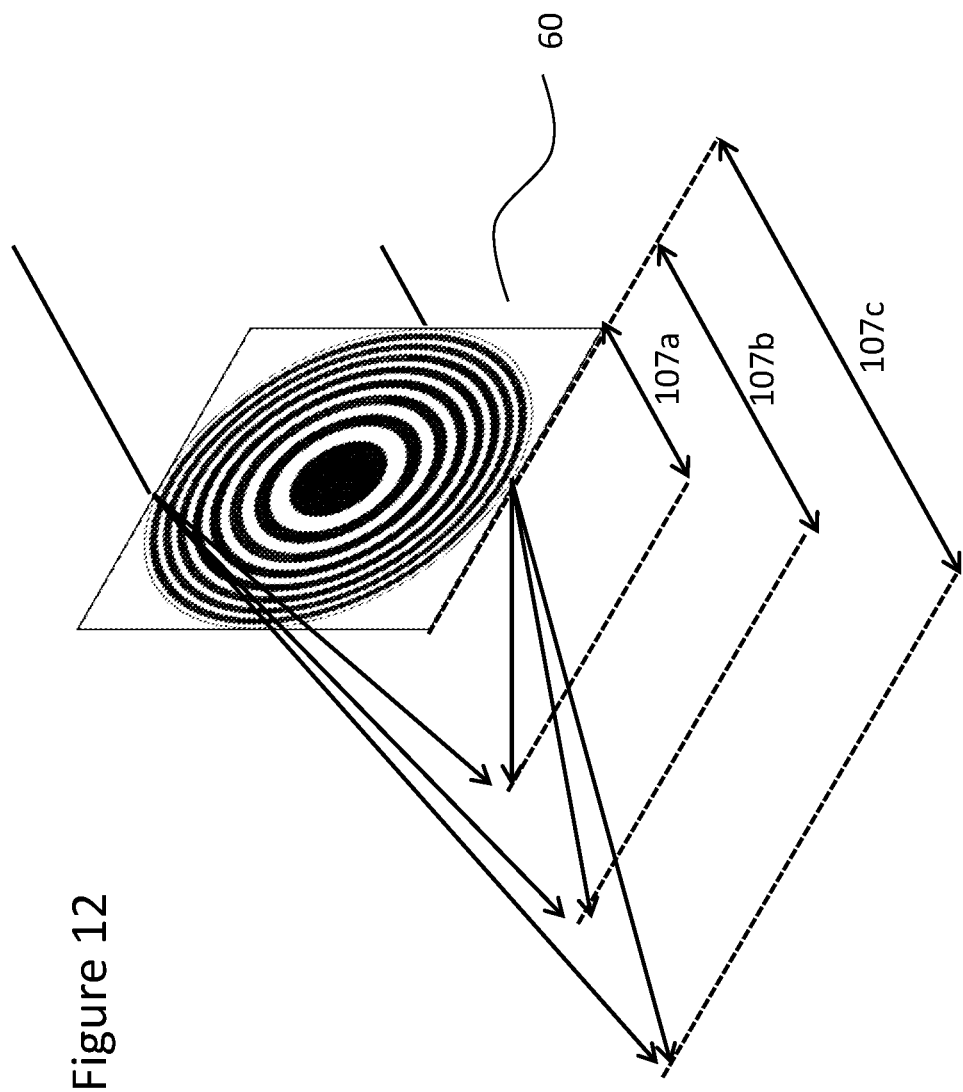
FIG. 12 is a schematic diagram illustrating an apparatus in accordance with another embodiment of the invention, where the variable power lens, instead of having a continuously variable focal length, has multiple discrete focal lengths that can be refocused to. This creates a combinatorial number of possible positions where the virtual image can be displayed.

FIG. 12 illustrates a sixth embodiment where, instead of the variable power lens 15 as proposed in the first embodiment, a lens 60 capable of refocusing to a discrete number of focal lengths 107*a*, 107*b*, 107*c* is used. The lens 60, when combined with the stack of switchable screens, would be capable of producing a combinatorial number of virtual images. The large number of virtual images could be spaced closely enough such that their discrete depths are not distinguishable to an ordinary observer. The lens could be a diffractive type lens, birefringent lens, or other known tuneable multi-focal length lenses. An advantage of this embodiment is that it may be less costly to manufacture and have a faster switching speed compared to the first embodiment.

Figure 13:
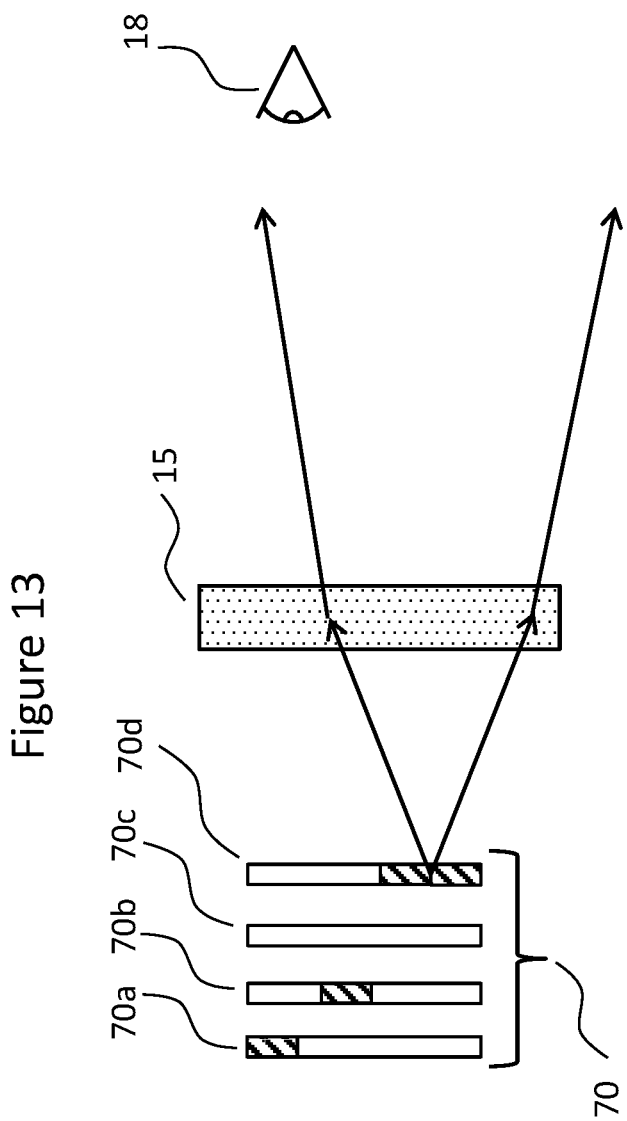
FIG. 13 is a schematic diagram illustrating an apparatus in accordance with another embodiment of the invention, the apparatus using multiple transparent LCDs/OLED instead of switchable scattering screens.

FIG. 13 illustrates a seventh embodiment where, instead of the switchable screens 13, a stack of transparent display panels 70 containing pixels with full image resolution are used. The transparent display panels 70 can produce a continuous image depth and/or contribute to the combinatorial number of possible virtual image depth planes. These screens 70 can be a stack of transparent liquid crystal panels, organic light emitting diode (OLED), inorganic LED arrays, wave guide displays, or other known methods of non-projector type transparent displays.

Figure 14:
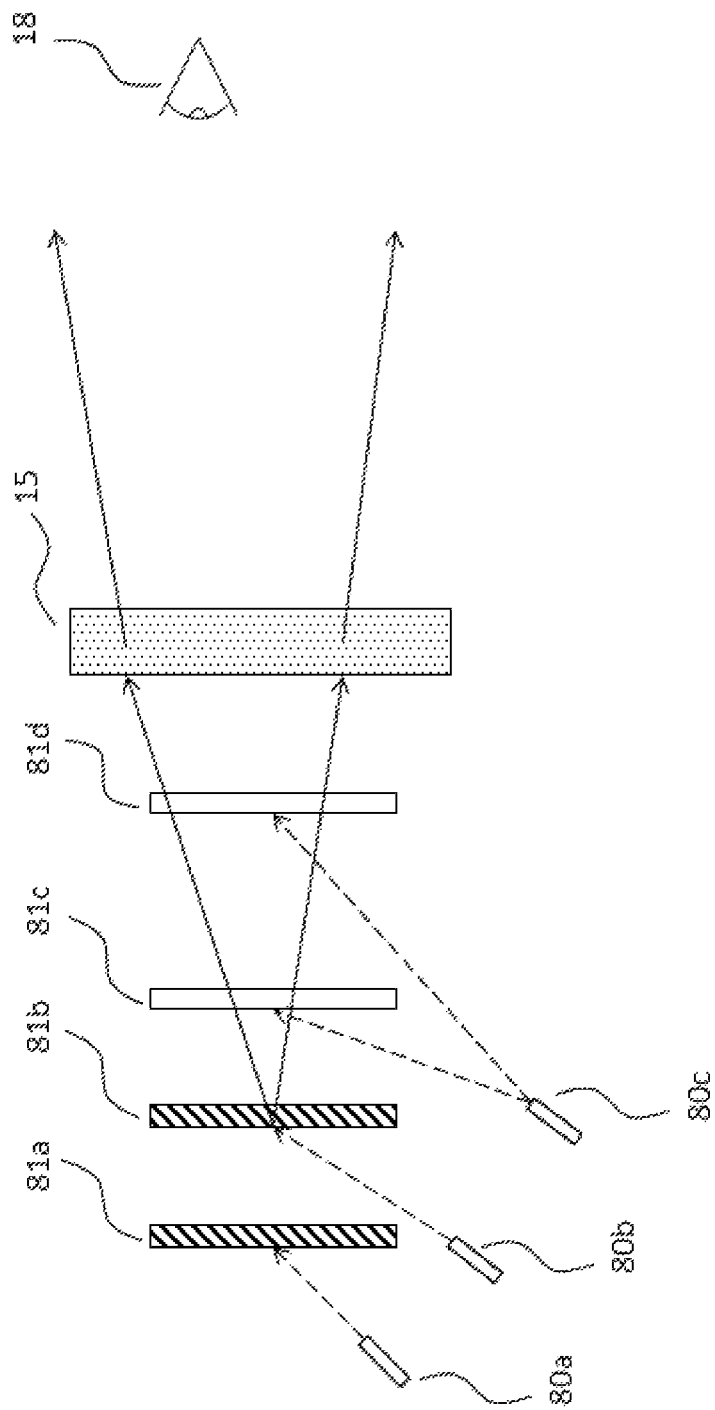
FIG. 14 is a schematic diagram illustrating an apparatus in accordance with another embodiment of the invention, the apparatus using multiple projectors, where each projector projects different images onto one or more switchable screens.

FIG. 14 illustrates an eighth embodiment where, instead of using only one laser projector, two or more projectors 80*a*-80*c* are used in the system. Each of the projectors 80*a*-80*c* may be capable of simultaneously projecting different images onto one or more screens 81*a*-81*d*. The projectors can be any known types of projectors, including laser scanning MEMs projector, Digital Light Processing (DLP) projector, LCD projectors, or Liquid Crystal on Silicon (LCoS) projectors. Light from each projector could be incident onto the screens at an oblique angle to avoid unwanted scattering from other screens to reduce haze. Because multiple projectors are used, high quality images can be achieved without the need to actively refocus images onto different screens.

In addition, if the screens are arranged such that they are not occluding each other from view, rapidly switching the variable power lens 15 would allow multiple volumetric images to be simultaneously visible to the driver. This could be achieved by spatially rearranging the screens, or by pixelating/partitioning the screens as described in the seventh embodiment.

Figure 15:
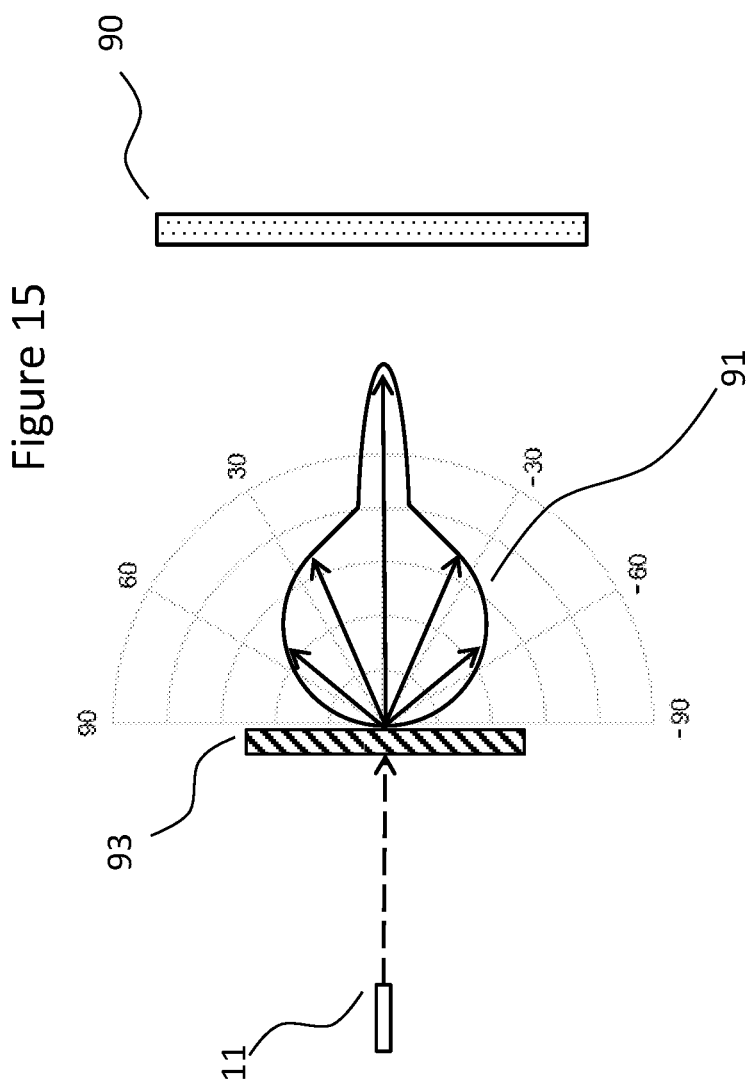
FIG. 15 is a schematic diagram illustrating an apparatus in accordance with another embodiment of the invention, the system using an interference filter to attenuate a specular laser beam.
Figure 16B:
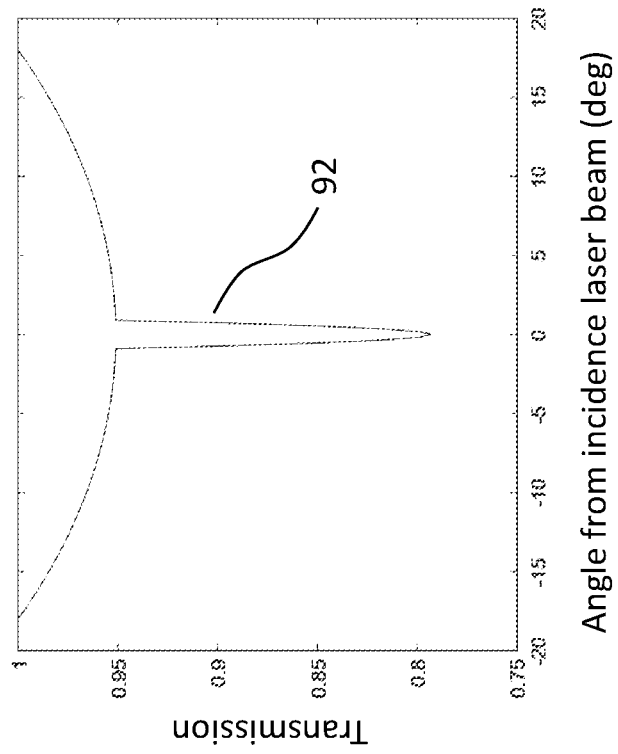
FIG. 16b illustrates a transmission profile of an interference filter at laser wavelength.
Figure 16A:
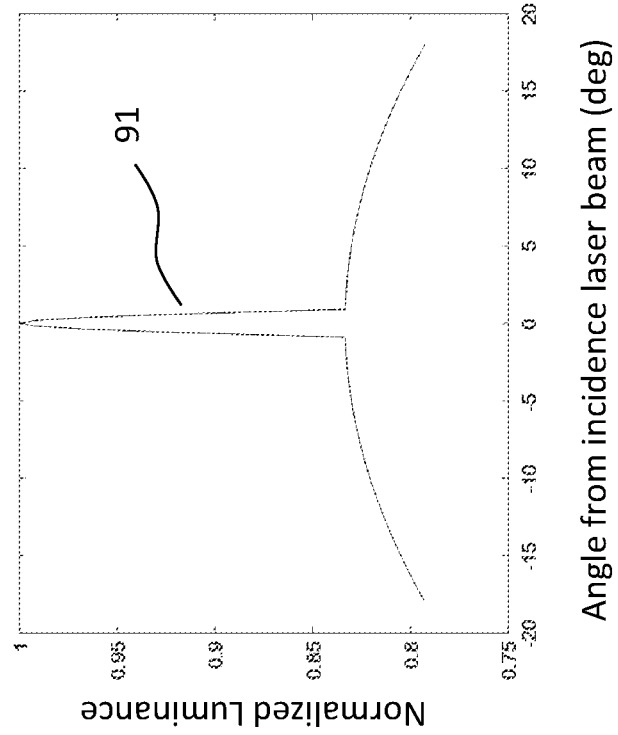
FIG. 16a illustrates a luminance profile of a PDLC screen in a scattering state.

FIG. 15 and FIGS. 16*a*-16*b* illustrate a ninth embodiment where an interference filter 90 with low transmission in the direction of the specular beam is used to attenuate the specular beam produced by the projector 11. As such, the projector 11 could be aligned parallel to the viewing axis of the HUD, which would provide improved optical efficiency. The interference filter 90 could also be designed such that its transmission as a function of angle from the incident laser beam 92 (FIG. 16*b*) is complementary to the luminance profile 91 (FIG. 15 and FIG. 16*a*) of the PDLC screen 93 in the scattering state. This would allow the user to see an image with uniform brightness independent from viewing position. The interference filter 90 could be designed for a single wavelength or multiple laser wavelengths.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

Industrial application will be mainly for automotive head-up-display systems. Application can be used in any vehicle for traffic information display. The HUD system can be fixed into the vehicle's dashboard by the automotive manufacturer or sold as individual components that could fit into any vehicles including uses for automotive training. The key advantage of the system is visual comfort. This is because the augmented reality display demonstrates all three dimensional depth cues, allowing information to be displayed at a variable distances as seen from the driver.

The invention claimed is:

1. A head-up-display (HUD) system, comprising:
at least one scanning laser projector operative to generate laser light;
a stacked array of multiple-switchable screens arranged relative to the projector to receive laser light generated by the projector, each screen of the stacked array of multiple-switchable screens spaced apart from one another and operative to switch between a transparent state and a diffusive state; and
a controller operatively coupled to the stacked array of multiple-switchable screens, the controller configured to time sequentially switch each screen of the array from a transparent state to a diffusive state, wherein only one screen is switched to the diffusive state at a given time,
wherein an output of the projector is configured at an angle or a distance from imaging optics succeeding the array of screens to prevent a specular beam emitted by the at least one scanning laser projector from intercepting the imaging optics succeeding the array of screens when all screens are in the transparent state.

2. The HUD system according to claim 1, wherein an output of the projector is attenuated below a prescribed level.

3. The HUD system according to claim 1, further comprising a first variable power lens arranged relative to the stacked array of multiple-switchable of screens to receive an image from the stacked array of multiple-switchable screens, the first variable power lens having a variable focal length, wherein the controller is operatively coupled to the first variable power lens and configured to continually sweep the focal length of the first variable power lens between a first focal length and a second, different, focal length.

4. The HUD according to claim 3, wherein the first variable power lens comprises a discrete number of different focal lengths.

5. The HUD system according to claim 2, further comprising a second variable power lens operatively coupled to the controller and arranged optically between the projector and the stacked array of multiple switchable screens, wherein the controller is configured to adjust the focal length of the second variable power lens to cause the beam waist radius to correspond to a pixel size of the projector.

6. The HUD system according to claim 1, further comprising a lens arranged optically between the projector and the stacked array of screens, the lens operative to focus a laser beam waist of a laser beam generated by the projector to be within the array of multiple-switchable screens.

7. The HUD system according to claim 1, wherein the laser projector is pixelated or partitioned such that only a portion of the same screen can be switched diffusive at any given time.

8. The HUD system according to claim 1, wherein the laser projector is arranged physically closer to a first screen of the stacked array of multiple-switchable screens, the first screen being a screen arranged optically closest to a viewer of an image generated by the HUD display.

9. The HUD system according to claim 8, wherein the stacked array of multiple-switchable screens comprises a permanent diffuser arranged optically furthest from a viewer of an image generated by the HUD display.

10. The HUD system according to claim 3, further comprising a combiner for displaying an image to a viewer, the combiner arranged to receive image output from the variable power lens.

11. The HUD system according to claim 10, further comprising at least one mirror arranged in an optical path between the stacked array of multiple-switchable screens and the combiner.

12. The HUD system according to claim 1, further comprising a polarizer arranged optically between the stacked array of multiple-switchable screens and an image output by the HUD display, wherein the stacked array of multiple-switchable screens are configured to preserve a polarization state of light transmitted through the screens while in the transparent state.

13. The HUD system according to claim 11, wherein the at least one mirror comprises a partially transparent mirror or a beam splitter.

14. The HUD system according to claim 1, wherein the projector comprises a micro-electromechanical system projector.

15. The HUD system according to claim 1, wherein the array of multiple-switchable screens comprise one of polymer dispersed liquid crystal screens, polymer network liquid crystal screens, polymer stabilized cholesteric texture liquid crystal screens, or holographic switchable diffusers.

16. The HUD system according to claim 1 wherein the at least one scanning laser projector comprises a plurality of scanning laser projectors, each projector configured to simultaneously project different images on to one or more of the stacked array of screens.

17. The HUD system according to claim 1, further comprising an interference filter configured to attenuate a specular beam produced by the projector.

18. A head-up-display (HUD) system, comprising:
at least one scanning laser projector operative to generate laser light;
a stacked array of multiple-switchable screens arranged relative to the projector to receive laser light generated by the projector, each screen of the stacked array of multiple-switchable screens spaced apart from one another and operative to switch between a transparent state and a diffusive state;
a first variable power lens arranged relative to the stacked array of multiple-switchable screens to receive an image from the stacked array of multiple-switchable screens, the first variable power lens having a variable focal length; and a controller operatively coupled to the stacked array of multiple-switchable screens, the controller configured to:
  time sequentially switch each screen of the array from a transparent state to a diffusive state, wherein only one screen is switched to the diffusive state at a given time; and
  integrate a virtual image with background image of a traffic scene by varying the focal length of the variable power lens.

* * * * *